UNITED STATES PATENT OFFICE.

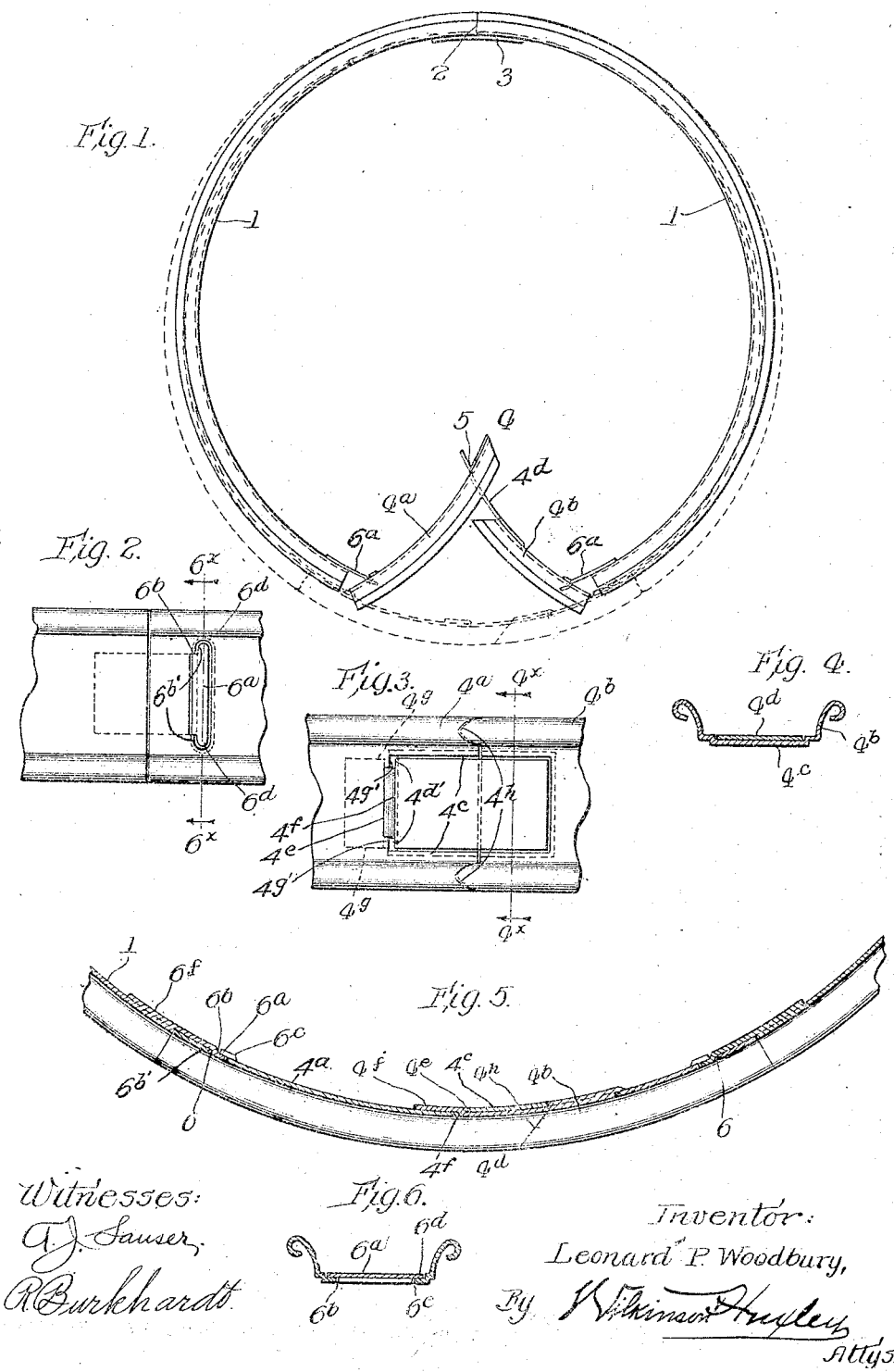

LEONARD P. WOODBURY, OF BERKELEY, CALIFORNIA, ASSIGNOR TO PARKER COLLAPSIBLE RIM CORPORATION, OF CHICAGO, ILLINOIS, A CORPORATION OF DELAWARE.

DEMOUNTABLE RIM.

1,341,000.   Specification of Letters Patent.   Patented May 25, 1920.

Application filed July 25, 1918. Serial No. 246,676.

*To all whom it may concern:*

Be it known that I, LEONARD P. WOODBURY, a citizen of the United States, residing at Berkeley, in the county of Alameda and State of California, have invented certain new and useful Improvements in Demountable Rims, of which the following is a specification.

My invention relates to rims for vehicle wheels upon which an inflatable tire may be mounted for application to or removal from the wheel with the rim. In my Letters Patent of the United States, No. 1,201,129, granted October 10, 1916, I have disclosed a demountable rim comprising a main section terminating in spaced ends and a toggle section having its members hinged together and to the spaced ends of the main section; the hinging together of the parts being accomplished by forming a tongue on one part passing through a slot on the other part with means to prevent the tongue being withdrawn from the slot and with the portions of the members immediately concerned with the hinge, overlapping to prevent radial displacement of the connected parts relatively to one another; and means to prevent separation of the parts when in collapsed position, being provided in the form of a projection from the wall of the slot entering an aperture in the tongue which extends through the slot.

The object of the present invention is to improve the construction of the hinging connections entering into the organization of parts above outlined in a manner securely to interlock the relatively movable members of the rim against circumferential separation or radial displacement when the rim is in use and to render the surface which receives the tire smooth and continuous when the rim is locked in distended position and to more firmly interlock the parts, particularly against displacement relatively to one another edgewise; also to simplify the construction, reduce the number of parts which enter into the organization and better adapt the design of the parts for quantity production by the use of dies. Accordingly, the connections between the members are formed by means of a plate rigidly projecting from one member across the joint between the members overlying the portion of the web of the other member beyond the joint, then extending through a slot in said other member, and having its end beyond the slot lapped upon the web of said other member; the plate being provided with a reduced neck that fits the slot in the lateral dimension of the rim and leaves shoulders on the plate on both sides of the slot; the web portions of the members which receive the portion of the plate lying next to the tire being countersunk to receive the plate; the countersink terminating at the slot and producing the effect of not only presenting a smooth surface to the tire but affording abutment in both circumferential directions for the plate; and the plate being deflected at its neck so that one pair of shoulders will be in circumferential alinement with the countersunk portion of the web and abut against the edge thereon, and the other pair of shoulders will lie in circumferential alinement with the normal web and abut against the edge thereof which is left at the end of the countersink; a system of shoulders abutting both circumferentially and laterally being thereby developed which increases the strength of the joints; and the use of lateral projections upon the plates or inserted members of the hinging connections, to resist circumferential strains of both tension and compression when the rim is in use, and limit intrusion of the plates through the slot and prevent their withdrawal when the rim is collapsed, being thereby rendered permissible without conflicting with or contributing to the roughness of the rim surface that receives the tire.

The invention will be readily understood upon reference to the accompanying drawings in which—

Figure 1 is an edge view of a complete rim embodying the features of my present invention;

Fig. 2 is a detail view of one of the sections between a toggle member and the main section as seen from the outside of the rim;

Fig. 3 is a detail view of the intermediate hinging connection between the members of the toggle;

Fig. 4 is a section on the line 4ˣ—4ˣ of Fig. 3;

Fig. 5 is a circumferential radial section showing the several hinging connections, the section being taken in about the middle plane of Figs. 2 to 6 inclusive;

Fig. 6 is a section on the lines 6ˣ—6ˣ of Fig. 2.

1, 1, represent the main section of the rim which is preferably constructed with resiliency by severing it at the point 2 and uniting its members through means of resilient splicing plate 3, although it may be rendered thus resilient by partially severing it at the point 2, as for instance through its flanges, leaving the web portion of the rim unsevered and relying on the original or on specially developed inherent resiliency of this web portion for flexibility. The rim further comprises the toggle section 4 composed of members $4^a$, $4^b$, hinged together at 5 and to the members 1, 1, at 6; this toggle and its hinging connections being designed to distend the rim to its normal service condition by pressing the toggle into alinement with the rim and to be self retaining in this position under the inherent circumferential compression developed in the rim through means of the joint 2, 3, if resiliency is employed therein or through the circumferential tension imposed by the tire as the case may be; the joint 2, 3, is preferably given a permanent set which tends to press the members of the main section together whenever the toggle is collapsed as shown in Fig. 1. As thus far described, the rim may correspond in general construction and operation to the subject matter of my Letters Patent hereinbefore identified. In order to develop the hinging connection 5, the member $4^a$ is provided in its web portion, near its meeting end, with a countersink or pocket $4^c$ that receives a hinge plate $4^d$ extending rigidly from the member $4^b$, as, for instance, by being spot-welded to its outer face and being, in this instance, countersunk in the web that carries it to leave the surface of the plate in circumferential alinement with the tire-receiving surface; the member $4^a$ being provided with a slot $4^e$ through which the plate projects and beyond which slot the plate has an end $4^g$ lying upon the underside of the web of said member $4^a$; and the plate being formed with a reduced neck $4^f$ where it enters the slot, which neck fits the slot in the lateral direction of the rim and leaves shoulders $4^{g'}$ on one side of the slot and shoulders $4^{d'}$ on the other side of the slot. Moreover, the plate is deflected at its neck $4^f$ in the direction of the radius of the rim, so that the shoulders $4^g$ will lie in position to abut against the end of the countersink in the member $4^a$, while the shoulders $4^{d'}$ will aline with the normal position of the web of the rim, and therefore be in a position to abut against the edge of the web left by the countersink. In this way the body of the plate $4^d$, which is wider than the slot $4^e$, has firm edgewise bearing against the member which it overlaps and thereby sustains the joint against lateral deflection, which is also assisted by the passage of the neck through the slot; and said plate also has abutment in both circumferential directions against edges of the web on the members which it overlaps in a manner to resist circumferential displacement under stresses which act either to expand or contract the rim. Moreover, shoulders $4^{d'}$ limit intrusion of the plate through the slot, and the shoulders $4^{g'}$ prevent withdrawal of the plate from the slot when the rim is collapsed. By referring to Fig. 5 it will be seen that the deflected portion or the offset between the parts $4^d$ and $4^f$ assumes such a position relative to the webs of the toggle members $4^a$, $4^b$, that these parts are kept separated in the circumferential direction by the shearing resistance of the offsetting part. Moreover the meeting ends of the toggle members $4^a$, $4^b$ as well as their flanges are in abutment at the line $4^h$ which marks the intersection between them.

Hinging connection 6 is produced by a tongue $6^a$ on one of the members, for instance a main section member 1, entering a slot $6^b$ in the other member, for instance the toggle member $4^a$ or $4^b$, such tongues extending across the joint between the members and lying in alinement with the web of the member where it is exposed toward the tire, in this instance the web of the member $4^a$ through which it projects. To this end the latter is provided with a seat $6^c$ upon which the inserted end overlaps, which seat is, depressed or countersunk relatively to the web of which it forms a part so that the tongue will lie in the plane of the web and will not contribute any unevenness or roughness to the latter. As shown in Fig. 5, tongue $6^a$ is deflected where it passes through the slot $6^b$, and this deflection provides a shoulder on one side of the slot which bears against the end of the deflected portion of member $4^a$ and limits intrusion of the tongue into the slot when the rim is collapsed. As shown in Fig. 2, the tongue $6^a$ is extended laterally at $6^d$ beyond the width of the slot $6^b$ and so forms an interlock to prevent withdrawal of the tongue. The countersinking of the seat $6^c$ is extended transversely of the rim in order to accommodate the laterally enlarged end $6^d$ as well as the body of the inserted tongue, as will be readily understood from Figs. 2 and 6. Preferably the interlocking tongue $6^a$ is formed of a separate plate of metal $6^f$, spot-welded or otherwise secured to the underside of the web of the member which carries it. Deflection of tongue $6^a$ at the slot $6^b$ leaves the portion of the tongue presented to the tire, namely, the enlarged head $6^d$, lying in circumferential alinement with the web and in position to abut the confines of the countersink in both lateral directions as well as both circumferential directions, and leaves the under portion of the tongue lying in circumferential alinement with the bottom of the countersink. As will be seen in Fig. 1, when the toggle is broken inward and the rim is collapsed, the toggle members bear substantially transversely upon the tongues which protrude through their ends and as shown in Fig. 5, when the toggle is pressed into circumferential position and the rim is distended, there is direct abutment between the webs and flanges of the members to resist circumferential compression.

Obviously any increased thickness of the web portion due to the lapping of the hinge parts beneath the same is objectionable since the opening for the inflating nipple in the rim and wheel felly will be so located as to bring the said overlapped portions in between the means which secure the rim to the wheel. The projecting ends of the inserted tongues can be temporarily deflected in any suitable way to admit the tongue through the slot that receives it and thereafter straightened out to resist withdrawal of the tongue.

I claim:

1. In a collapsible tire rim comprising main and hinging members; a joint between two members comprising a splicing member rigidly projecting from one member across the joint between the members, overlapping upon the web of the other member, and extending thence through a slot therein and overlapping said other member beyond the slot therein; the splicing member being countersunk into the web where it is presented toward the tire, and being deflected where it passes through the slot to bring its portions on opposite sides of the slot, in circumferential alinement respectively, with the normal portion of the web and the countersunk portion thereof, and having its end laterally enlarged beyond the slot which brings it into circumferential bearing against the end of the countersink.

2. In a collapsible tire rim comprising main and hinging members, a joint between two members comprising a splicing member rigidly projecting from one member across the joint between the members, overlapping upon the web of the other member, and extending thence through a slot therein and overlapping said other member beyond the slot therein; the splicing member being countersunk into the web where it is presented toward the tire, and being deflected when it passes through the slot to bring its portions on opposite sides of the slot, in circumferential alinement respectively, with the normal portion of the web and the countersunk portion thereof, and having its end laterally enlarged beyond the slot which brings it into circumferential bearing against the end of the countersink; and said splicing member having its body portion on the opposite side of the slot from its enlarged end, also laterally enlarged relatively to the slot, leaving a reduced neck that fits the slot, and providing shoulders which bear against the web circumferentially in the direction to resist compression of the ring.

Signed at Chicago, Illinois, this 22nd day of July, 1918.

LEONARD P. WOODBURY.